United States Patent [19]

Lin

[11] Patent Number: 5,272,401
[45] Date of Patent: Dec. 21, 1993

[54] STEPPING MOTOR DESIGN

[76] Inventor: Ted T. Lin, 12307 Crayside La., Saratoga, Calif. 95070

[21] Appl. No.: 749,286

[22] Filed: Aug. 23, 1991

Related U.S. Application Data

[63] Continuation-in-part of Ser. No. 716,972, Jun. 18, 1991, abandoned.

[51] Int. Cl.$^5$ .................. H02K 37/14; H02K 37/00
[52] U.S. Cl. .................. 310/49 R; 310/254; 310/261; 318/696
[58] Field of Search ............ 310/49 R, 156, 168, 310/106, 254, 257, 261, 263; 318/696

[56] References Cited

U.S. PATENT DOCUMENTS

| | | | |
|---|---|---|---|
| 3,809,990 | 5/1974 | Kuo et al. | 318/696 |
| 3,866,104 | 2/1975 | Heine | 318/696 |
| 4,025,810 | 5/1977 | Field | 310/162 |
| 4,206,374 | 6/1980 | Goddijn | 310/49 R |
| 4,255,696 | 3/1981 | Field, II | 318/696 |
| 4,355,248 | 10/1982 | Manson | 310/42 |
| 4,355,249 | 10/1982 | Kenwell | 310/49 R |
| 4,550,280 | 10/1985 | Freise | 318/701 |
| 4,623,809 | 11/1986 | Westley | 310/49 R |
| 4,638,195 | 1/1987 | Lin | 310/49 R |
| 4,910,475 | 3/1990 | Lin | 310/49 R |

Primary Examiner—Steven L. Stephan
Assistant Examiner—D. R. Haszko

[57] ABSTRACT

Apparatus for improving the angular resolution of a stepping motor in which the effective step angle of the motor is reduced by a factor of two with no change in the nominal pitch angle. In one embodiment, a group of two stator laminations, angularly offset from one another, are used. In a second embodiment, two rotors, angularly offset from one another, are used, together with two non-offset stator stacks. In an alternative mode of the second embodiment, two stator stacks, angularly offset from one another, are used, together with two non-offset rotors. In a first mode of a third embodiment, a rotor having first and second rotor caps is laterally surrounded by first and second stators, and the two rotor caps, but not the two stators, are angularly offset from one another by the step angle. In a second mode of the third embodiment, the two stators, but not the two rotor caps, are angularly offset from one another by the step angle. In a fourth embodiment, the stator pitch angle is twice the rotor pitch angle so that the stator teeth are not aligned with more than half the rotor teeth at any time.

9 Claims, 13 Drawing Sheets

STATOR 67 WINDING FOR ODD PHASES
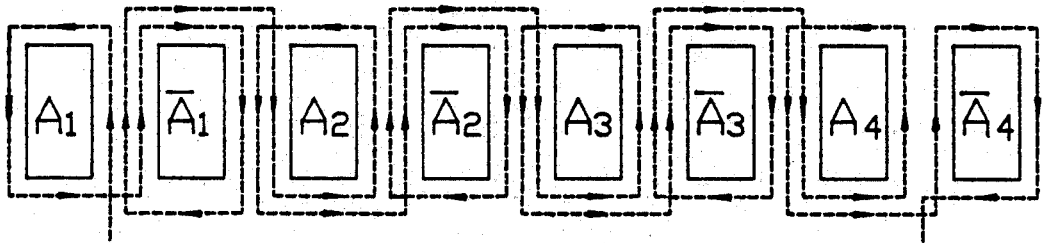
FIG. 6A
STATOR 69 WINDING FOR EVEN PHASES
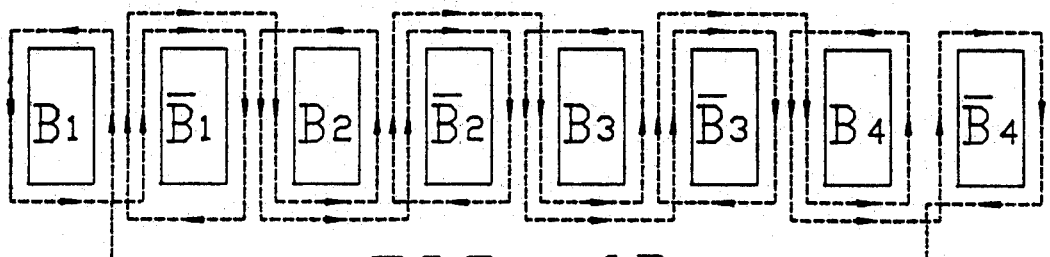
FIG. 6B
HYBRID MOTOR ENERGIZING SEQUENCE
|  | $S_1$ | $S_2$ | $S_3$ | $S_4$ | $S_5$ | $S_6$ | $S_7$ | $S_8$ |
|---|---|---|---|---|---|---|---|---|
| $A_i$ | N | N | – | S | S | S | – | N |
| $\overline{A}_i$ | S | S | – | N | N | N | – | S |
| $B_i$ | – | N | N | N | – | S | S | S |
| $\overline{B}_i$ | – | S | S | S | – | N | N | N |
i REPRESENTS 1, 2, 3, 4
FIG. 6C STATOR 87 WINDING FOR ODD PHASES
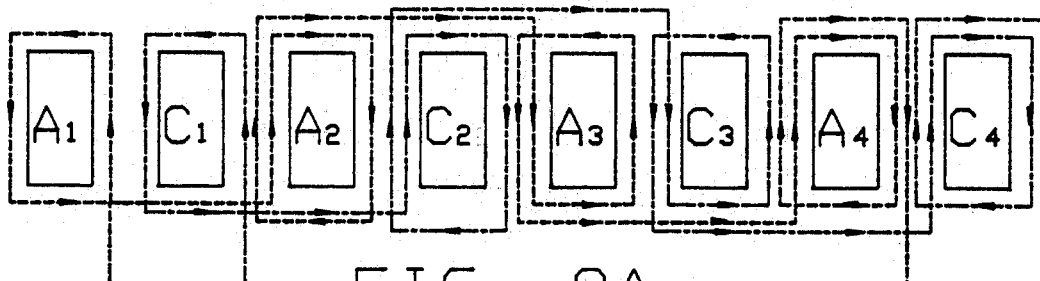
FIG. 9A
STATOR 89 WINDING FOR EVEN PHASES
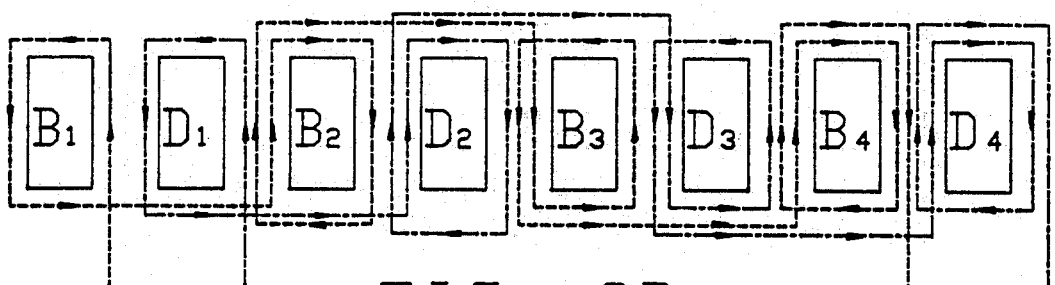
FIG. 9B
VR MOTOR ENERGIZING SEQUENCE
|     | $S_1$ | $S_2$ | $S_3$ | $S_4$ | $S_5$ | $S_6$ | $S_7$ | $S_8$ |
|-----|-------|-------|-------|-------|-------|-------|-------|-------|
| $A_i$ | N | N | — | — | — | — | — | N |
| $A_j$ | S | S | — | — | — | — | — | S |
| $B_i$ | — | N | N | N | — | — | — | — |
| $B_j$ | — | S | S | S | — | — | — | — |
| $C_i$ | — | — | — | N | N | N | — | — |
| $C_j$ | — | — | — | S | S | S | — | — |
| $D_i$ | — | — | — | — | — | N | N | N |
| $D_j$ | — | — | — | — | — | S | S | S |
i REPRESENTS 1, 3
j REPRESENTS 2, 4
FIG. 9C 67 or 69 or 87 or 89

STEPPING MOTOR DESIGN

FIELD OF THE INVENTION

This patent application is a continuation-in-part of an earlier-filed application, U.S. Ser. No. 07/716,972, filed Jun. 18, 1991, now abandoned, and is entitled to the benefits stated in 37 C.F.R. 1.62. This invention relates to improvements in stator and rotor design for stepping motors.

BACKGROUND OF THE INVENTION

Stator design for a stepping motor is constrained by equations relating the pitch angle, number of poles used, number of phases used, number of rotor teeth used, and other parameters. Stator design is also constrained by practical manufacturing considerations. Adjacent stator teeth with pitch angles less than about 4° are difficult or impossible to construct for stepping motors of a size normally used for semiconductor fabrication. Use of a smaller pitch angle allows greater resolution, if all other factors remain about the same, so that decreasing the stator pitch angle is desirable. With present thin metal stamping technology, the lower limit on the step angle for a four-phase motor of reasonable size is about 0.9°. In principle, a 0.45° step angle would require a rotor diameter of at least 4.4 cm, which is too large for many applications.

Another problem of stepping motor design is to increase the number of stator poles for a fixed number of phases, such as four or eight, for a motor of fixed size. This would allow an improvement in step response. However, conventional approaches again confront manufacturing limitations, and only a modest number of poles can be included in a motor of rotor diameter 4 cm or less.

Kuo et al, in U.S. Pat. No. 3,809,990, disclose use of three coaxial, magnetically independent stator sections or laminations with alternating polarity, the stator teeth of one section being angularly offset from the teeth of each of the other stator sections. The apparatus operates in a stepping mode or in a continuous mode.

In U.S. Pat. No. 3,866,104, Heine discloses a five-phase stepping motor in which a first winding, then a second winding, then a third winding, then a fourth winding, then a fifth winding is short-circuited, one winding at a time, so that the non-energized winding moves from one pole group to another in succession.

Use of two coaxial rotors, angularly offset from one another and separated by a non-magnetic spacer, and eight uniformly spaced stator poles with identical stator and rotor pitch angles, is disclosed by Field in U.S. Pat. No. 4,025,810. Stator teeth at two opposing positions 180° apart are aligned with the adjacent rotor teeth, and stator poles located at the 90° and 270° positions are completely misaligned with the adjacent rotor teeth. The stator teeth at the 45°, 135°, 225° and 315° positions are intermediate between these orientations with respect to the adjacent rotor teeth. The stator pole windings are alternatingly energized and non-energized. Field, in U.S. Pat. No. 4,255,696, discloses another invention using two coaxial rotor sections with rotor teeth angularly displaced relative to one another.

Manson discloses a stepping motor that uses two coaxial stator sections, positioned back-to-back with a magnetic spacer therebetween and subjected to magnetically independent energization in U.S. Pat. No. 4,355,248. However, the angular rotation, if any, of one stator section relative to the other stator section is unclear.

Use of two identical, coaxial stator sections, positioned back-to-back, is disclosed in U.S. Pat. No. 4,623,809, issued to Westley. Again, it is unclear from the discussion whether the two stator sections are angularly offset relative to one another.

What is needed are stator and rotor designs that allow reduction in step angles to angles much less than 1° and/or allow an increase in the number of stator poles, consistent with currently available manufacturing techniques.

SUMMARY OF THE INVENTION

These needs are met by an inventive design that, in one embodiment, includes M coaxial stator laminations, numbered $m = 1, 2, \ldots, M$ ($M \geq 2$), each stator pole having K teeth ($K \geq 2$) and stator laminations number 2, 4, 6, ... being angularly offset by an angle $\Delta\theta_0 = \phi_p/2$ relative to stator laminations number 1, 3, 5, ..., where $\phi_p$ is the stator pitch angle. This embodiment also includes a rotor, coaxial with the M stator laminations, having a plurality of uniformly spaced rotor teeth, and having an axially-oriented magnetic field. The embodiment also includes current-carrying stator windings and activatable current sources to sequentially induce magnetic fields in the stator poles.

In a first mode of the second embodiment, the invention includes two coaxial, aligned stator stacks, numbered $m = 1, 2$ and not angularly offset from one another. This embodiment also includes two sets of rotors, numbered $m = 1, 2$, coaxial with the two stator stacks, with rotor number 2 being angularly offset by a step angle $\Delta\theta_0 = \phi_s$ relative to rotor number 1, each rotor having two rotor components with a plurality of uniformly spaced rotor teeth and having an axially-oriented magnetic field. In a second mode of this embodiment, the two stator stacks may be angularly offset relative to one another by the step angle $\Delta\theta_0 = \phi_s$ and the two rotors may be aligned with one another. The second embodiment also includes current-carrying stator windings and activatable current sources to sequentially induce magnetic fields in the stator poles.

In a third embodiment, two stators and a coaxial rotor with two rotor caps are used, and the two stators, or the two rotor caps, but not both in the same motor, are angularly displaced from each other by the step angle. In a fourth embodiment, the stator pitch angle is twice the rotor pitch angle so that at most one half of a group of rotor teeth can be aligned with the adjacent stator teeth in a stator pole group.

BRIEF DESCRIPTION OF THE DRAWINGS

FIGS. 6A and 6B illustrate the winding diagrams for two stator stacks for a hybrid stepping motor constructed according to the invention.

FIG. 6C illustrates a suitable half stepping sequence for the hybrid motor embodiment of FIGS. 6A and 6B.

FIGS. 9A and 9B illustrate the winding diagrams for two stator stacks for a variable reluctance stepping motor constructed according to the invention.

FIG. 9C illustrates a suitable stepping sequence for the variable reluctance motor of FIGS. 9A and 9B.

FIG. 15 is a sectional view illustrating a third embodiment of the invention.

DESCRIPTION OF BEST MODE OF THE INVENTION

Figure 1:
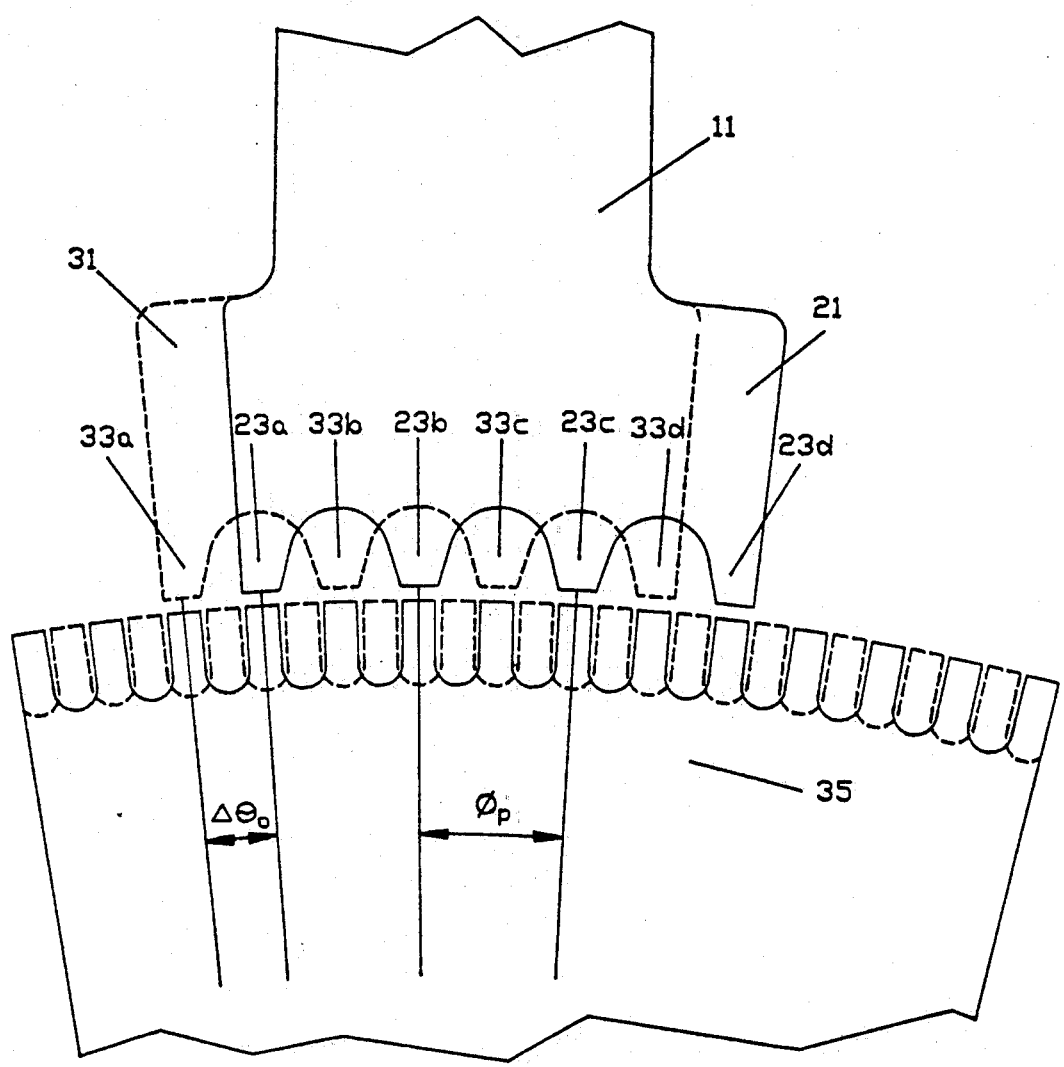
FIG. 1 is a side view of one embodiment of the invention.

FIG. 1 illustrates one embodiment 11 of the invention. A first stator lamination 21 has a sequence of uniformly spaced teeth 23a, 23b, 23c, 23d, .... A second stator lamination 31 is coaxial with the first stator lamination 21, but is angularly offset therefrom by rotation by an angle $\Delta\theta_o$, with $$\Delta\theta_o = \phi_p/2, \quad (1)$$

where $\phi_p$ is the nominal pitch angle of the stator. The second stator lamination 31 has stator teeth 33a, 33b, 33c, 33d, ... that are angularly offset from the corresponding teeth of the first stator lamination 21 by the constant angle $\Delta\theta_o$, which is the effective pitch angle of the stator. In many stepping motors in the prior art, the pitch angle $\phi_p$, step angle $\phi_s$ and number of phases N of the motor are constrained by the relation $$\phi_p = N\phi_s. \quad (2)$$

The embodiment 11 in FIG. 1 increases the resolution (or, equivalently, decreases the effective step angle $\phi_s$) for the stator by a factor of two, while maintaining the same nominal pitch angle $\phi_p$ for the stator teeth.

In the embodiment 11 shown in FIG. 1, the rotor 35 has uniformly spaced rotor teeth with pitch angle $\Delta\theta_o$. This embodiment may be used, for example, with a hybrid stepping motor, which is discussed generally in *Stepping Motors: A Guide to Modern Theory and Practice* by P. P. Acarnley, Peter Peregrinus Ltd. Press, 1982, pp. 1-58, and incorporated herein by reference.

Figure 2:
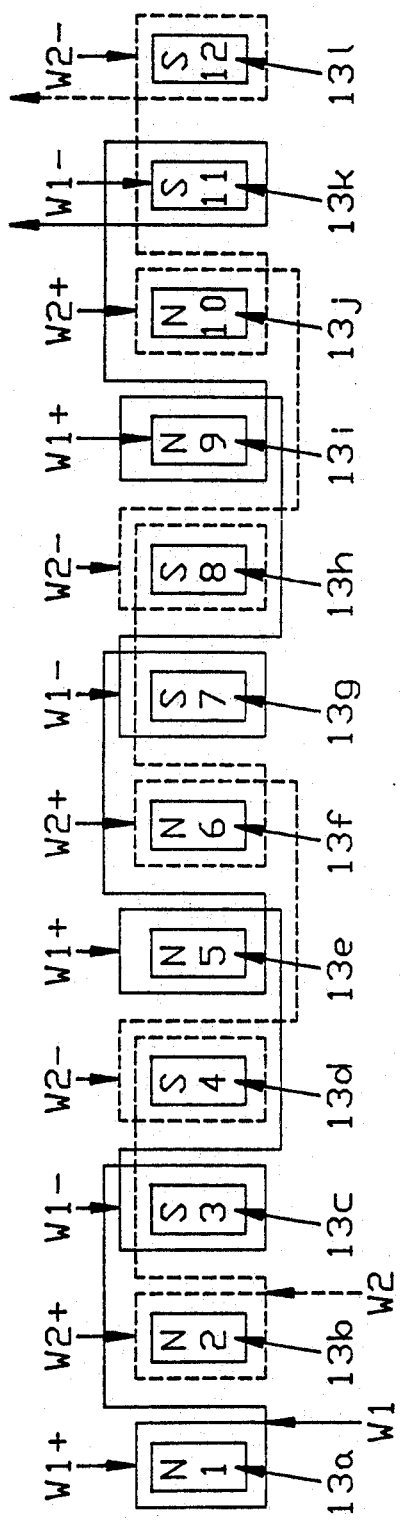
FIG. 2 is a schematic view of stator winding orientation for a hybrid stepping motor.

In a hybrid stepping motor, the rotor has a permanent magnet mounted thereon, and two separate windings, denoted W1 and W2 herein, which are used for the stator poles for a twelve-pole motor, as shown in FIG. 2. Winding W1 would be wound positively around poles 1, 5 and 9, (43a, 43e and 43i, respectively) and would be wound in the opposite or negative sense around poles 3, 7 and 11. Similarly, winding W2 would be wound positively around poles 2, 6 and 10, and would be wound in the opposite or negative sense around poles 4, 8 and 12. The result of this choice of windings is that the windings for poles 1-12 have the orientations W1+, W2+, W1−, W2−, W1+, W2+, W1−, W2−, W1+, W2+, W1−, W2−, respectively. When a direct current is caused to flow in winding W1, this induces a vector magnetic field B1 that is directed as shown in FIG. 2 in the stator poles 1, 3, 5, 7, 9 and 11. Note that the direction of the magnetic field B1 alternates between being directed outwardly and being directed inwardly as one proceeds from one pole in this group of six to the next pole in the group. In one embodiment, during the time that direct current flows in the winding W1, no current flows in the winding W2. After a predetermined time interval $\Delta t_w$, the direct current in winding W1 is terminated and the direct current of equal magnitude is established in the winding W2; this produces the vector magnetic field B2, also directed, in each of the stator poles 2, 4, 6, 8, 10 and 12. Note that the magnetic field direction also alternates from one pole in this group of six to the next pole in the group. Direct current flows alternatingly or simultaneously in the windings W1 and W2.

Figure 3:
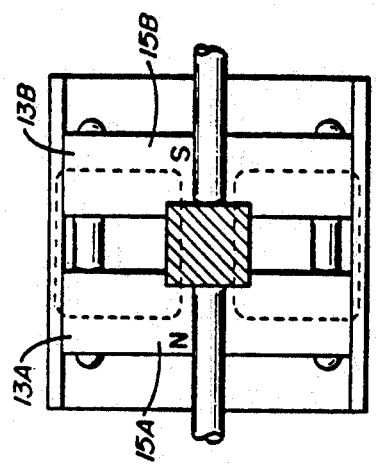
FIG. 3 is a sectional side view of the rotor, illustrating a magnetic circuit linking the rotor and stator.

The rotor includes one or more sets of uniformly spaced rotor teeth, with each set being arranged in a circular pattern and lying in a plane, where the two planes are parallel but spaced apart from each other. Viewed along the rotor axis that is perpendicular to these two planes, the sets of rotor teeth are offset from one another by an angle that is one-half the rotor pitch angle, as illustrated in FIG. 3. Thus, if the rotor teeth in one of these sets are out of alignment with corresponding stator teeth by one-half the pitch angle, the rotor teeth in the other set are aligned with the corresponding stator teeth, and conversely.

Assume that current is flowing only in winding W1 in a particular time interval of length $\Delta t_w$ and that certain rotor teeth adjacent to poles 1, 5 and 9 (43a, 43e, and 43i, respectively in FIG. 2) are approximately aligned with the corresponding stator pole teeth in those three poles. The rotor 45 (FIG. 3) is free to rotate, and it will attempt to rotate to a position that minimizes the reluctance $S = L/\mu A$ for the magnetic circuit involving the winding W1 shown in FIG. 2, where L, A and $\mu$ are the length, area and magnetic permeability for a component of the circuit. The reluctance of all components of this circuit except the air gap component are substantially unchanged for any angular position of the rotor 45. Thus, a first set of rotor teeth will attempt to rotate to a position that minimizes the reluctance associated with the air gap component of the magnetic circuit in FIG. 2; and this will occur when a maximum number m of consecutive rotor teeth in that set, shown in FIG. 1, are precisely aligned with m stator pole teeth for each of the poles 1, 5 and 9 shown in FIG. 2. At this point, m consecutive rotor teeth that are adjacent to the stator pole teeth for each of the poles 3, 7 and 11 will be one-half pitch angle or 1.8° out of alignment for the first rotor teeth set; but the poles 3, 7 and 11 of the second set of rotor teeth will be aligned, and the poles 1, 5 and 9 of this second set of rotor teeth will be out of alignment by one-half the pitch angle. Keeping in mind the effects of the angular offset of one set of rotor teeth relative to the other set of rotor teeth, attention is focused on only one of the two sets of rotor teeth. The reluctance associated with the magnetic flux circuit that includes the rotor teeth for poles 3, 7 and 11 of the first set is less effective than the reluctance associated with the magnetic flux circuit that includes rotor teeth from the first set for poles 1, 5 and 9; and, in a first approximation, the rotor alignment force for the rotor teeth adjacent to poles 1, 5 and 9 is the factor initially considered here.

During a second time interval of length $\Delta t_w$, the current in winding W1 is terminated and the current in winding W2 is established. The inertia of the rotor, which is moving clockwise in this embodiment, plus the alignment force associated with the m motor teeth that are adjacent to each of stator poles 2, 6 and 10, cause the teeth of the rotor 45 to rotate clockwise by one-quarter of the pitch angle or 0.9°, so that these rotor teeth are now perfectly aligned with the m stator teeth for each of the poles 2, 6 and 10; misalignment of the rotor teeth of either set adjacent to stator poles 4, 8 and 12 is ignored, to a first approximation. This requires rotation of the teeth in each set of the rotor 45 by an angular amount of one-quarter of the pitch angle (say, 0.9°) during a time interval of length $\Delta t_w$. The rotation continues during a third time interval of length $\Delta t_w$, wherein the current in the winding W2 is terminated and current in the winding W1 is re-established. During this third time interval of length $\Delta t_w$, seven rotor teeth adjacent to the m stator teeth in each of the poles 3, 7 and 11 are now aligned therewith. During a fourth time interval of length $\Delta t_w$, m rotor teeth that are adjacent to the m stator teeth in each of poles 4, 8 and 12 are aligned therewith. The result of this action is that the rotor moves a distance of 4(0.9°)=3.6° in a time interval of $4\Delta t_w$. This corresponds to a rotational speed of $(400\Delta t_w)^{-1}$. The effect is qualitatively unchanged for two stators, such as 21 and 31, that have a center-to-center offset of $\phi_{12}$ as in FIG. 1. Thus, the alignment forces are qualitatively unchanged from one pole to the next consecutive pole.

Figure 4:
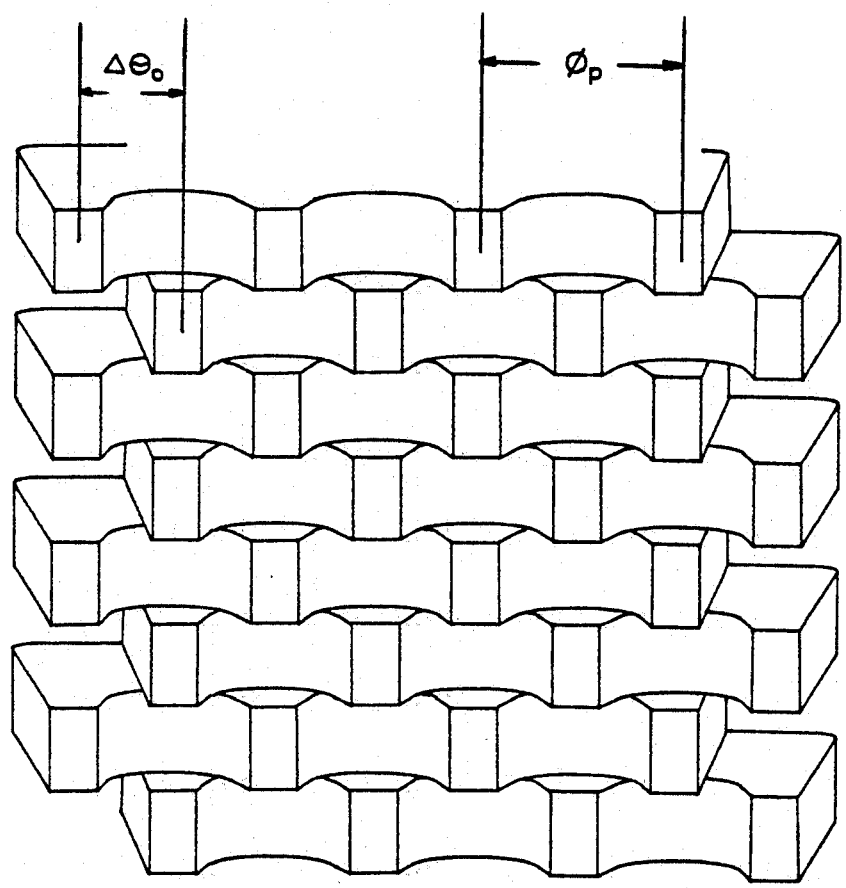
FIG. 4 is a perspective view of the stator used in FIG. 1.

The embodiment illustrated in FIG. 1 allows a decrease in the effective step angle $\phi_s$ of the stator without requiring a decrease in nominal pitch angle $\phi_p$ so that current manufacturing technology can be used to fabricate a stepping motor that incorporates this invention. The angular resolution, or minimum rotation angle that can be controlled and sensed, of a stepping motor incorporating this invention is effectively reduced by a factor of two. FIG. 4 is a perspective view of a group of stator teeth, constructed according to the embodiment of FIG. 1, with eight stator laminations.

Figure 5:
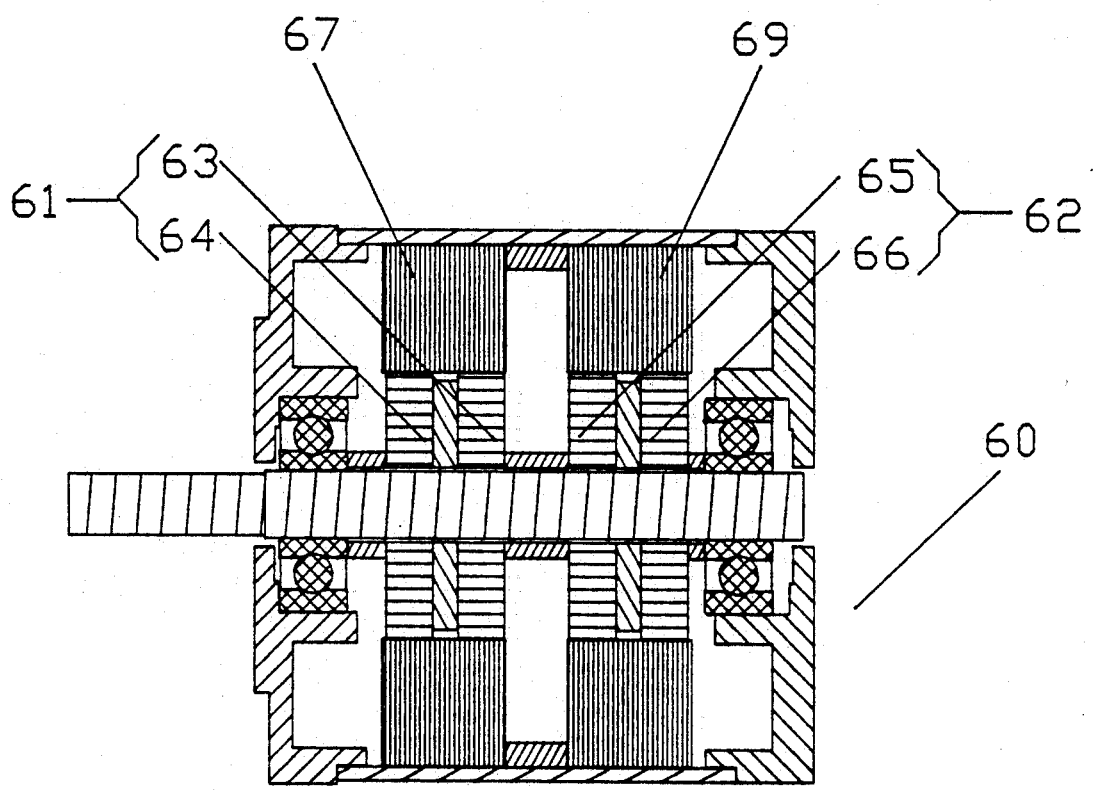
FIG. 5 is a sectional side view illustrating a second embodiment of the invention for a hybrid motor.

In a second embodiment 60 of the invention, illustrated schematically in FIG. 5 for a hybrid stepping motor, two stator stacks and two rotors, all coaxial, are used to reduce the number of poles required in each stator stack for operation. The first rotor 61 has two rotor components 63 and 64, the second rotor 62 has two rotor components 65 and 66, and each of these four rotor components has a set of $K_r$ uniformly spaced rotor teeth. The teeth of the rotor components 63 and 64 are angularly offset by an amount $\Delta\theta_{34}=\phi_p/2=N\phi_s/2$ relative to one another, the teeth of the rotor components 65 and 66 are angularly offset by an amount $\Delta\theta_{56}=\phi_p/2=N\phi_s/2$ relative to one another; and the teeth of the rotor components 63 and 65 are angularly offset from one another by an amount $\Delta\theta_{35}=\phi_s$, where N is the number of motor phases (N>1). A first stator 67, positioned adjacent to the rotor 61, and a second stator 69, positioned adjacent to the second rotor 62, together form a stator stack, and the two stators are not angularly offset relative to one another in this first mode of the second embodiment. Each of the two stators 67 and 69 has the same pitch angle as the rotor. The first stator 67 is wound or wired for operation with a first predetermined current phase, denoted "even phase", and the second stator 69 is wound or wired for operation with a second predetermined current phase, denoted "odd phase", that may be out of phase with the first stator current phase by a phase angle $\Delta\beta_{79}=360°/N$. Assume that the teeth of the rotor component 63 are aligned with the teeth of the first stator 67 at a time $t=t_o$. At this time, the teeth of the rotor component 65 associated with the second rotor 62 are misaligned with the teeth of the second stator 69 by the offset angle $\phi_s$.

If the electrical signal that drives the two stators 67 and 69 is sinusoidal and has a frequency $f=1/T$, at a time $t=t_o+T/2$, the rotor teeth in the second rotor 62 will now move or rotate by the step angle $\phi_s$ in order to align themselves with the teeth on the second stator 69, in order to minimize the reluctance $S_2=L_2/\mu_2A_2$ of the magnetic circuit that includes the rotor components 65 and 66 and the second stator 69. The first rotor 61 will not resist this rotation, but will help promote the rotation, in order to minimize the reluctance $S_1=L_1/\mu_1A_1$ of the magnetic circuit that includes the rotor components 63 and 64 and the first stator 67. At a later time $t=t_o+2(T/2)$, the positions are reversed, and the first and second rotors 61 and 62 will both rotate by an angle $2\phi_s$, relative to their respective positions at time $t=t_o$, in reacting to the further phase change and in minimizing the total reluctance $S=L_1/\mu_1A_1+L_2/\mu_2A_2$ of the magnetic circuits. The rotational speed associated with this change of phase is thus $2\phi_s/T=\phi_r/T=360°/K_rT$, expressed in degrees per second, or $1/K_rT$, expressed in cycles per second.

FIGS. 6A and 6B illustrate the winding diagram and direction of current flow for the "odd" and "even" phases, respectively, for a hybrid stepping motor constructed according to the embodiment discussed in FIG. 5. For example, the stator poles $A_1$ and $\overline{A}_1$ are counter-wound so that their polarities are reversed relative to one another. FIG. 6C illustrates suitable pole polarities associated with the poles $A_1$, $A_1$, $B_1$ and $B_1$ for eight 6C illustrates suitable pole polarities associated with the poles $A_1$, $\overline{A}_1$, $B_1$ and $\overline{B}_1$ for eight.

Figure 7A:
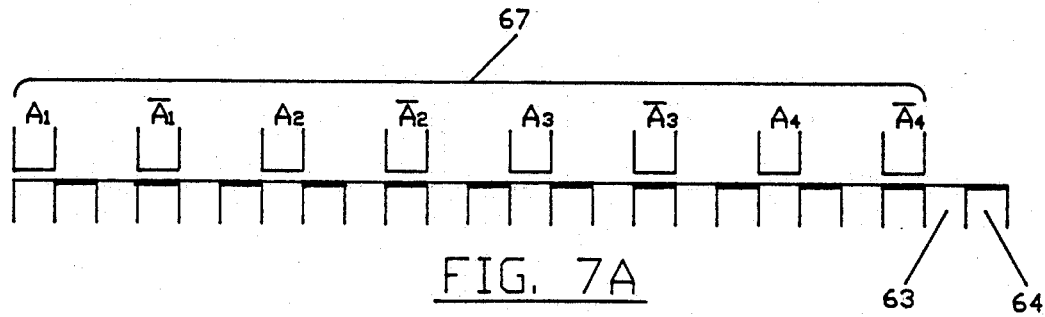
FIGS. 7A, 7B, 7C and 7D illustrate the alignment or partial alignment of stator and rotor teeth for a single phase "on" (FIGS. 7A and 7B) and for two phases "on" (FIGS. 7C and 7D) for a hybrid motor constructed according to the invention.
Figure 7B:
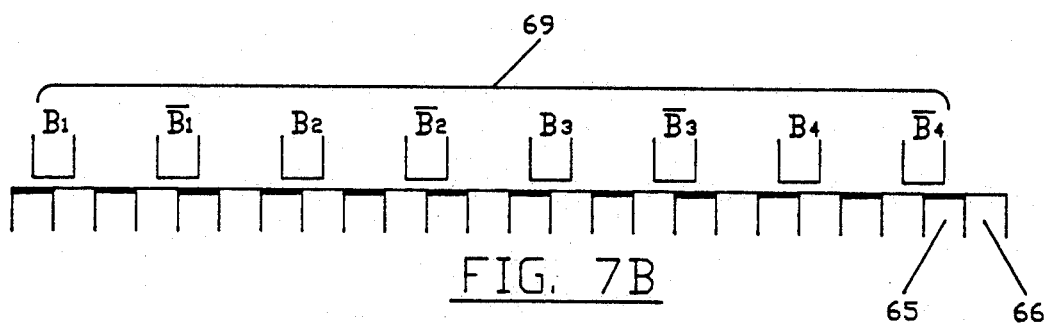
Figure 7C:
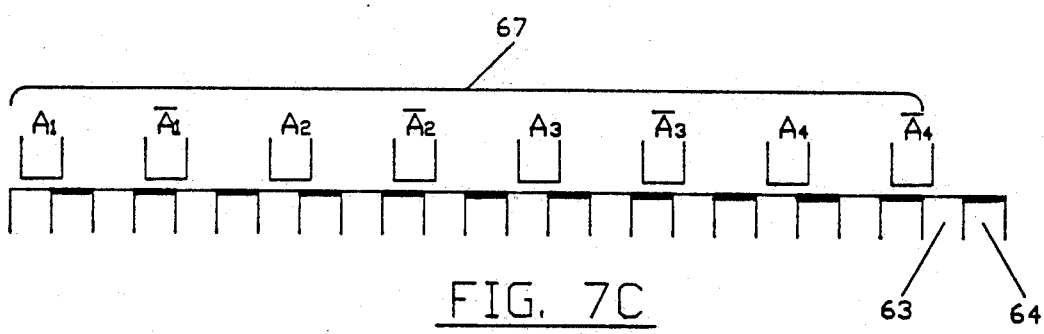
Figure 7D:
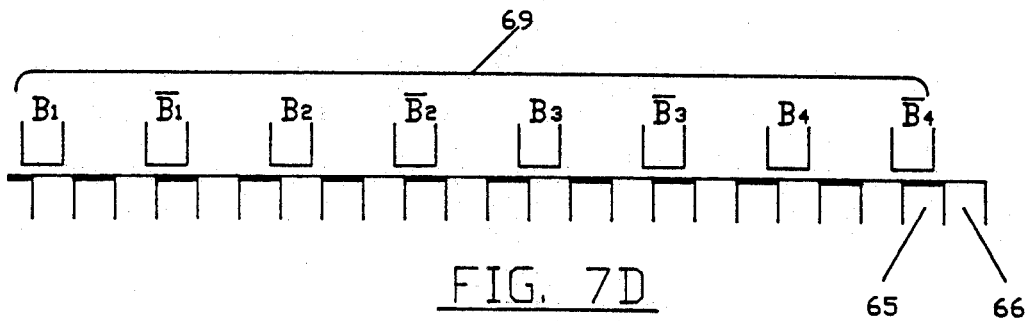

FIG. 7A illustrates the alignment of eight sets of stator teeth ($A_1$, $\overline{A}_1$, $A_2$, $\overline{A}_2$, $A_3$, $\overline{A}_3$, $A_4$ and $\overline{A}_4$) relative to adjacent rotor teeth of the first rotor components 63 and 64, when phase A is energized and phase B is not energized, for the hybrid motor illustrated in FIG. 5. FIG. 7B illustrates the misalignment of a second eight sets of stator teeth ($B_1$, $\overline{B}_1$, $B_2$, $\overline{B}_2$, $B_3$, $\overline{B}_3$, $B_4$ and $\overline{B}_4$) relative to adjacent rotor teeth of a second rotor components 65 and 66, when phase A is energized and phase B is not energized. FIGS. 7C and 7D illustrate the alignments and misalignments of the rotor components shown in FIGS. 7A and 7B, respectively, after one half step rotation of the rotor components 63 and 64, or 65 and 66, when both phases A and B are energized. FIGS. 5 and 7A-7D illustrate the first mode of the second embodiment, in which the stepping motor is a hybrid motor having two aligned stator stacks and two out-of-alignment rotors.

Figure 8:
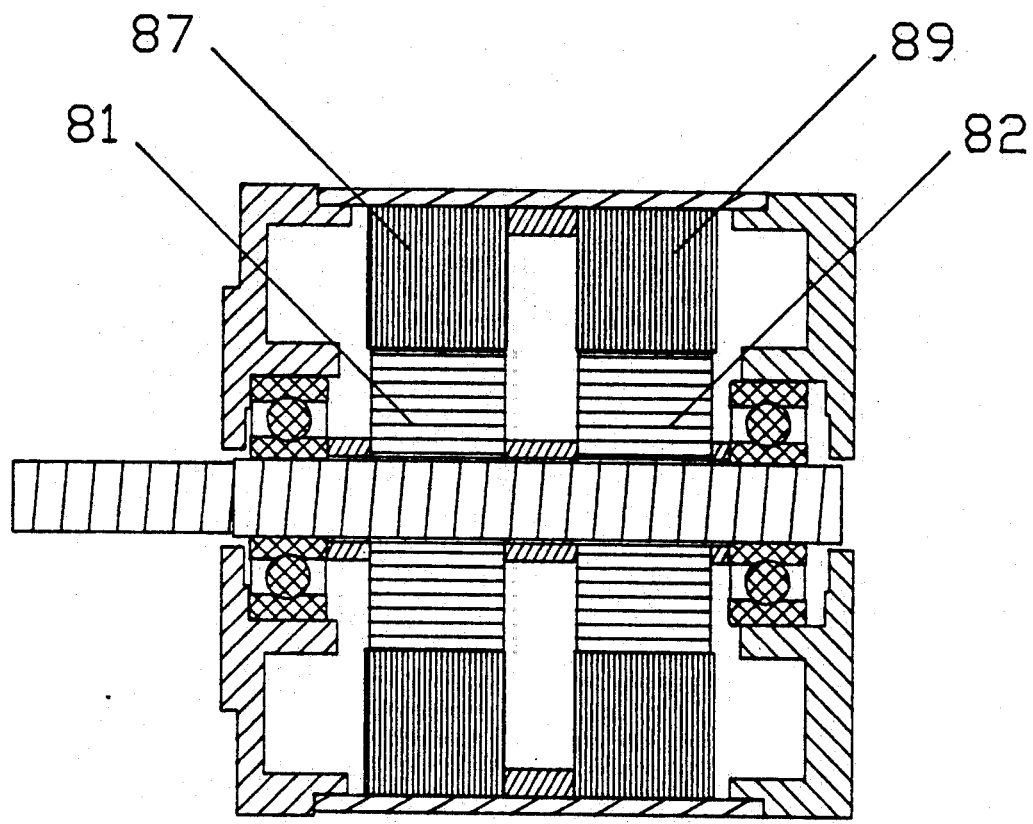
FIG. 8 is a sectional side view illustrating the second embodiment for a variable reluctance stepping motor.

FIG. 8 is a sectional side view of a variable reluctance ("VR") stepping motor constructed according to the second embodiment of the invention. In this embodiment, two coaxial rotors 81 and 82 and two stators 87 and 89 are provided. Where a VR motor is to be constructed, two modes are again available. In a first mode of the second embodiment for a VR motor, the teeth of the rotors 81 and 82 are angularly offset from one another by an angle $\Delta\theta_{12}''=\phi_s$; the teeth of the two stators 87 and 89 are not angularly offset from one another; and the current phases of the two stators 87 and 89 are related as in the first mode of the second embodiment for a hybrid motor. In a second mode of the second embodiment for a VR motor, the teeth of the rotors 81 and 82 are not angularly offset from one another; the teeth of the stators 87 and 89 are angularly offset from one another by an angle $\Delta\beta_{79}'''=\phi_s$; and the current phases of the two stators 87 and 89 are related as in the second mode of the second embodiment for a hybrid motor.

FIGS. 9A and 9B illustrate the winding diagram and direction of current flow for the "odd" and "even" phases, respectively, for a variable reluctance stepping motor constructed according to the embodiment discussed in FIG. 5. FIG. 9C illustrates suitable pole polarities associated with the poles $A_1$, $B_1$, $C_1$ and $D_1$ for eight consecutive steps $S_i$ ($i=1, 2, \ldots, 8$) in rotation of the rotor.

Figure 10A:
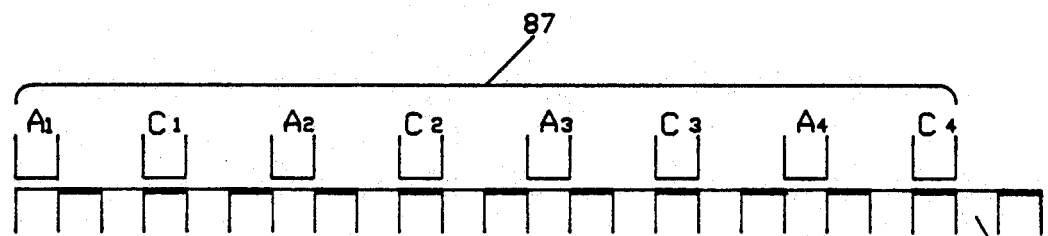
FIGS. 10A, 10B, 10C and 10D illustrate the alignment or partial alignment of stator and rotor teeth for a single phase "on" (FIGS. 10A and 10B) and for two phases "on" (FIGS. 10C and 10D) for a variable reluctance motor according to the invention.
Figure 10B:
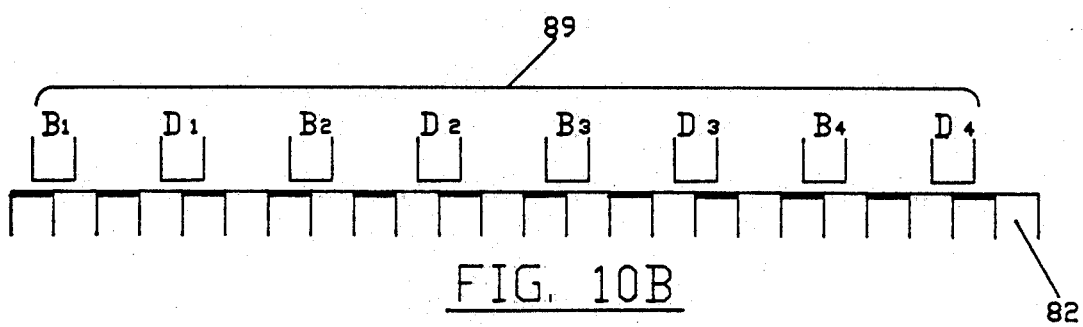
Figure 10C:
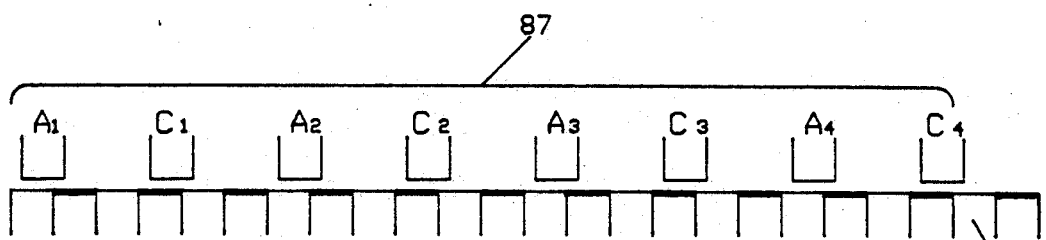
Figure 10D:
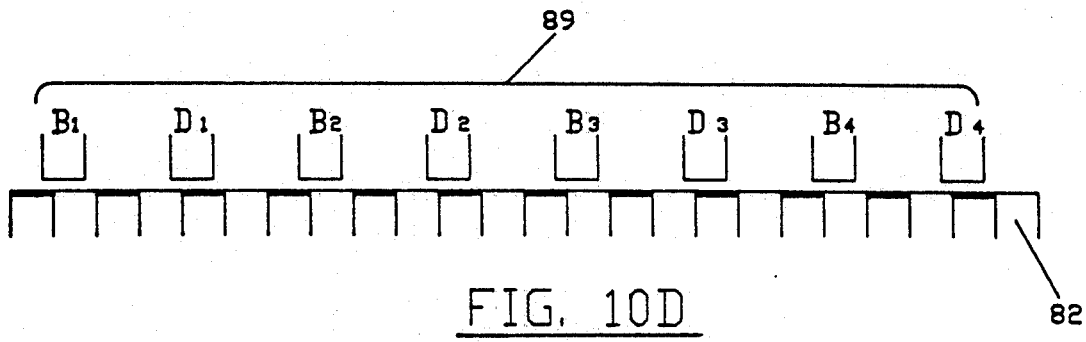

FIG. 10A illustrates the alignment and misalignment of a first set of eight stator teeth ($A_1$, $C_1$, $A_2$, $C_2$, $A_3$, $C_3$, $A_4$ and $C_4$) of a VR stepping motor relative to adjacent rotor teeth of the first rotor 81 in FIG. 9, when phase A is energized and phase B is not energized. FIG. 10B illustrates the misalignment of a second set of eight stator teeth ($B_1$, $D_1$, $B_2$, $D_2$, $B_3$, $D_3$, $B_4$ and $D_4$) relative to adjacent rotor teeth of the second rotor 82, when phase B is energized and phase A is not energized. FIG. 10C and 10D illustrate the relative alignment of the stator teeth and rotor teeth shown in FIGS. 10A and 10B, respectively, after one half step rotation of the rotors 81 and 82, when both phases A and B are energized. The windings for the stators have the same phase delay relative to one another as for the stators 87 and 89 discussed in connection with the first mode of the second embodiment.

Figure 11:
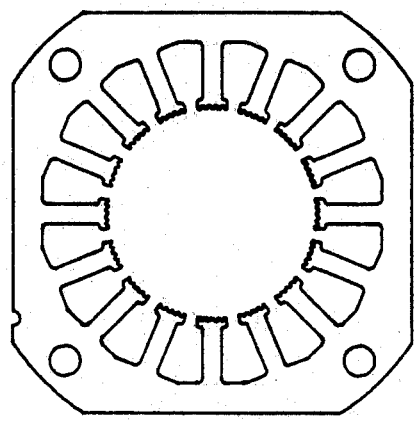
FIG. 11 illustrates a prior art stator having four phases and a step angle of 0.9°.
Figure 12:
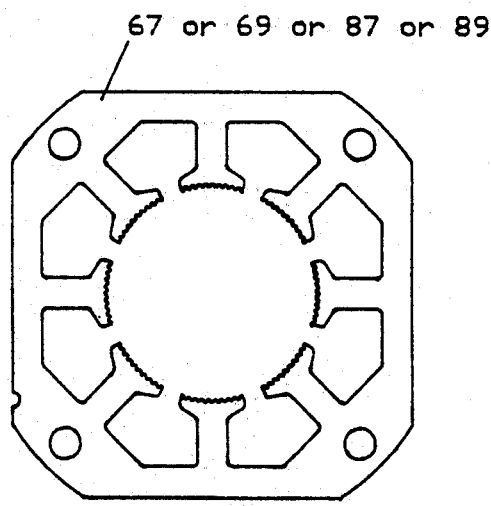
FIG. 12 is a section view of one of two identical stator stacks constructed according to a second embodiment of the invention.

These approaches allow use of half as many poles to achieve the same angular resolution. For example, a four-phase motor with a step angle of 0.9°, which would require a 16-pole stator with a conventional approach (FIG. 11), may be implemented with two 8-pole stators using the second embodiment illustrated in FIG. 12. A four-phase motor with a step angle of 0.45° may be fabricated, using two 16-pole stators in the second embodiment, where the conventional approach would require use of a 32-pole stator.

Figure 13A:
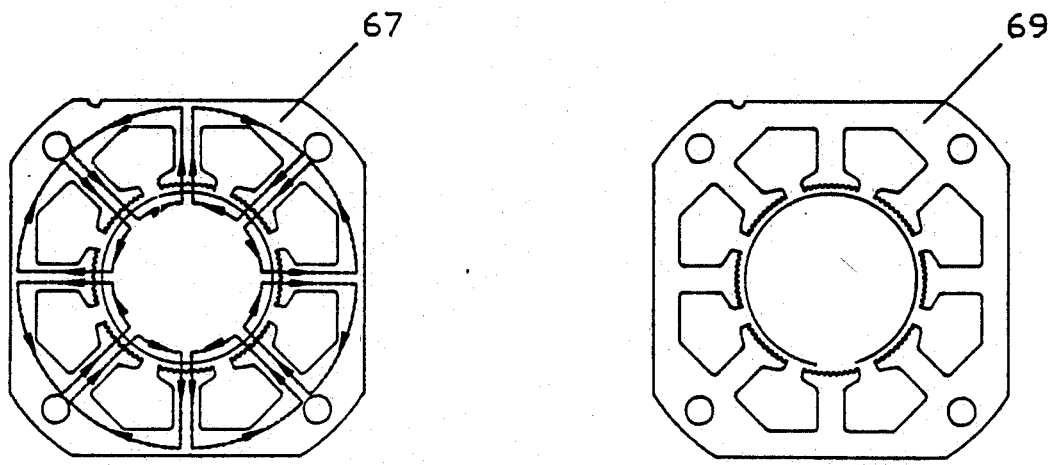
FIGS. 13A and 13B illustrate the magnetic flux paths for a single phase "on" and for two phases "on", respectively, for a hybrid motor constructed according to the invention.
Figure 13B:
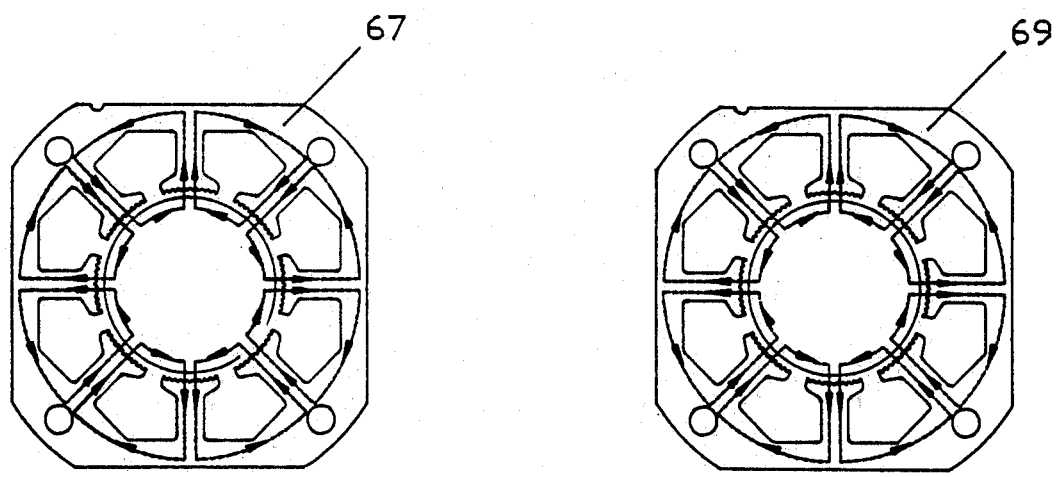
Figure 14A:
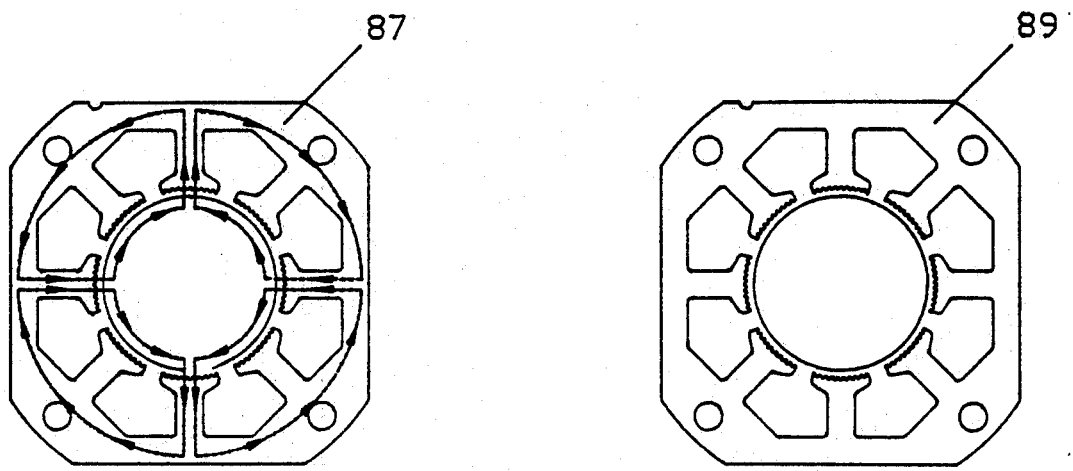
FIGS. 14A and 14B illustrate the magnetic flux paths for a single phase "on" and for two phases "on", respectively, for a variable reluctance motor constructed according to the invention.
Figure 14B:
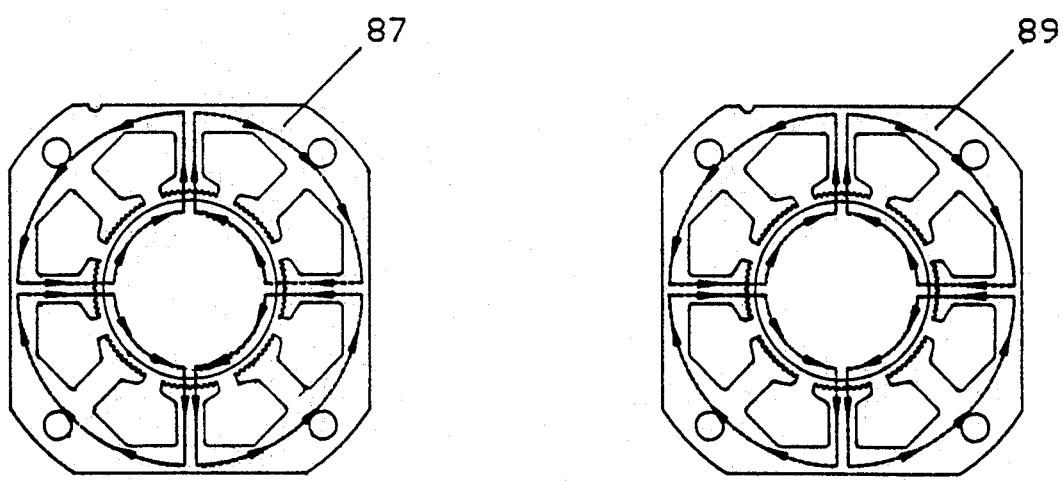

FIGS. 13A and 13B illustrate the magnetic flux paths for a hybrid stepping motor for a single phase "on" and for two phases "on", respectively. FIGS. 14A and 14B illustrate the magnetic flux paths for a variable reluctance stepping motor for a single phase "on" and for two phases "on", respectively, using the second embodiment.

FIG. 15 is a sectional view of a stepping motor constructed according to a first mode of a third embodiment of the invention. In this mode of the third embodiment, one coaxial rotors, including two rotor caps 101 and 102, and two stators 107 and 109 are provided. The teeth of the rotor caps 101 and 102 are angularly offset from one another by a rotor step angle $\Delta\theta_{12}''=\phi_s$. The teeth of the two stators 107 and 109 are not angularly offset from one another in this embodiment, and the current phases of the two stators 107 and 109 are related as in the first mode of the second embodiment for a hybrid motor.

In a second mode of this third embodiment, the teeth of the rotor caps 101 and 102 are not angularly offset from one another; but the teeth of the two stators 107 and 109 are angularly offset from one another by an angle $\Delta\theta_{79}'''=\phi_s$, and the current phases of these two stators are related as in the second mode of the second embodiment for a hybrid motor.

The embodiment illustrated in FIG. 15 is similar to the embodiment illustrated in FIG. 5, but the two rotor pairs 63/64 and 65/66 are replaced by two individual rotor caps 101 and 102 in FIG. 15. The embodiment shown in FIG. 15 reduces the flux leakage problems that sometimes arise where two rotors are positioned in a side-by-side arrangement, as in FIG. 5. However, operations of the embodiments shown in FIGS. 5 and 15 are similar. The embodiment illustrated in FIG. 15 is suitable for operation as a hybrid motor, if the two rotor caps 101 and 102 are spaced apart by a permanent magnet 112. The embodiment illustrated in FIG. 15 is suitable for operation as a VR motor if the two rotor caps 101 and 102 are spaced apart by a magnetically conductive material 112.

In the third embodiment illustrated in FIG. 15, the component 111 of the motor housing that overlies the two stators 107 and 109 should be constructed of a magnetically conductive material, such as iron, steel, nickel or cobalt to carry the magnetic flux required.

Figure 16:
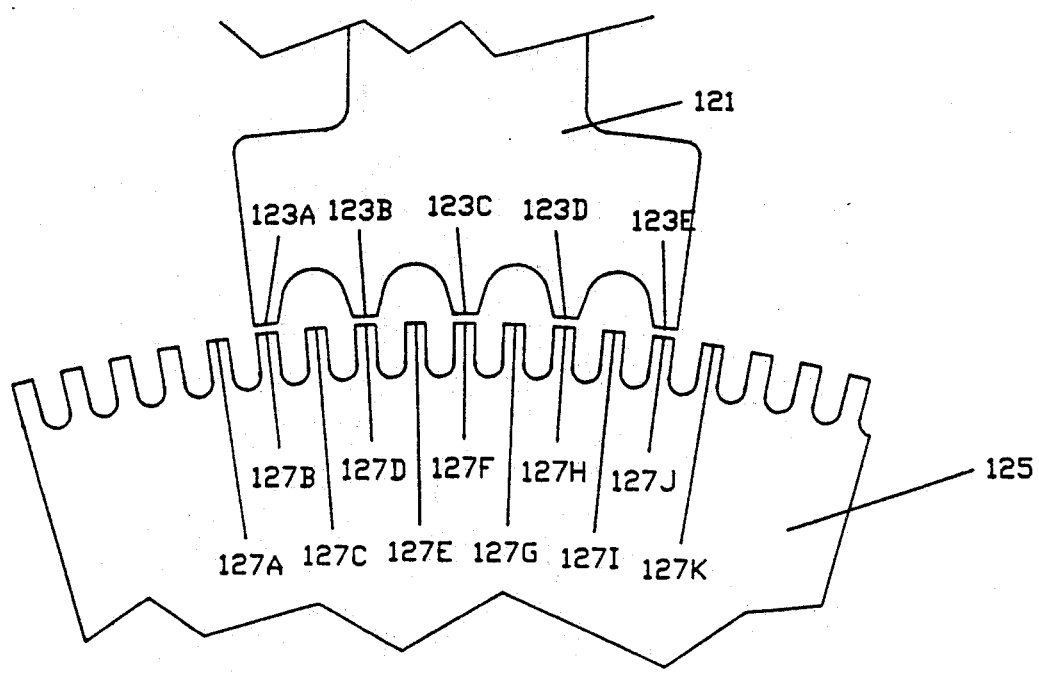
FIG. 16 is a sectional view illustrating a fourth embodiment of the invention.

In a fourth embodiment of the invention, illustrated in FIG. 16, a stator pole group 121 has a plurality of stator teeth 123A, 123B, 123C and 123D with a stator pitch angle $\phi_p$, and a coaxial rotor 125 has a plurality of rotor teeth 127A, 127B, $\ldots$, 127L with a rotor pitch angle $\phi_r$. The stator pitch angle and the rotor pitch angle are related by the equation $\phi_p=M\phi_r$, where M is an integer $\geq 2$. Preferably, M=2 here, as illustrated in FIG. 16, but greater values of the integer M are also suitable. Any two adjacent stator teeth will be separated by a pitch angle that is at least twice the rotor pitch angle so that the stator teeth in a pole group such as 121 will lie closest to every other rotor tooth, such as 127B, 127D, 127F, 127H and 127J. The body of the stator pole group 121 is fabricated from a plurality of punched sheets, superimposed upon one another. In a hybrid motor constructed according to FIG. 16, soft magnetic material in the rotor caps carries the magnetic flux lines of a central magnet. In a variable reluctance motor constructed according to FIG. 16, the rotor is unexcited and is made of magnetically soft iron, and the rotor teeth 127A-127J are attracted by the energized stator teeth 123A-123D in a stator pole group.

Figure 17:
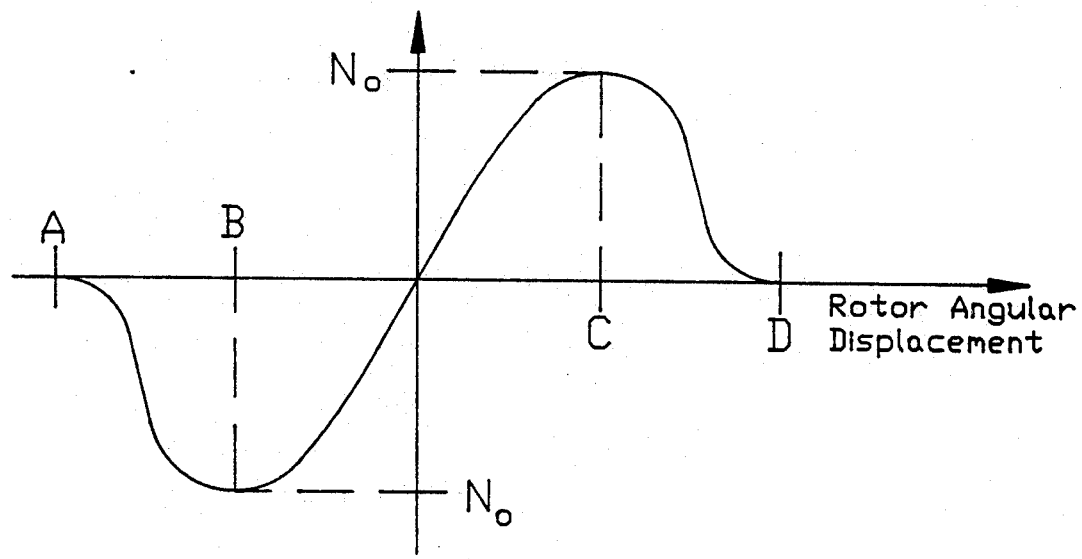
FIG. 17 is a graphical view illustrating static torque developed, as a function of rotor angular displacement, for one mode of the fourth embodiment.

FIG. 17 illustrates graphically the static holding torque developed versus rotor angular displacement for the configuration shown in FIG. 16 with M=2. With this configuration, the torque developed by angular displacement of the rotor will be distorted somewhat compared to torque for a conventional design in which the stator pitch angle and the rotor pitch angle are equal. Rotor angular displacement $\Delta\theta$ ranges between A and D on the abscissa, and the useful range of rotor angular displacement for torque development purposes lies between the values B and C, where the torque curve is sinusoidal and is undistorted in shape from the conventional design. The peak-to-peak torque $2N_0$ is correspondingly reduced from the peak-to-peak torque for a conventional design. For $M=2$, the configuration of FIG. 16 may be realized by use of a hybrid motor or by use of a variable reluctance motor. The configuration shown in FIG. 17 also reduces the flux leakage that might otherwise be present with the configuration shown in FIG. 1.

What is claimed is:

1. Stepping motor apparatus for improved angular position control, the apparatus comprising:

first and second coaxial rotors, each having a first motor component and a second rotor component, each of the four rotor components having a plurality of K uniformly spaced teeth, where K is a predetermined positive integer, with the first and second rotor component teeth on each rotor being angularly displaced relative to one another by an angle $\Delta\theta_0 = \phi_r/2$, where $\phi_r$ is the nominal rotor pitch angle, with the teeth on the first rotor component of the first rotor and the teeth on the first rotor component of the second rotor being angularly offset relative to one another by a rotor step angle $\phi_s$, and each rotor component including magnet means, polarized in the direction of the rotor axis, for impressing a magnetic field in the rotor axis direction on the rotor teeth;

a first stator and a second stator that are coaxial with the first and second rotors, respectively, each stator having a plurality of stator poles and a plurality of stator teeth that are uniformly spaced within each stator pole and that have a nominal stator pitch angle $\phi_{sta} = \phi_r$, where the first and second stators have no angular offset relative to one another and laterally surround the first and second rotors, respectively;

a first plurality of M current-carrying stator windings, consecutively numbered $m_1 = 1, 2, \ldots, M$, where each stator winding in the first plurality winds around one or more stator poles of the first stator, and where M is a predetermined positive integer;

a second plurality of M current-carrying stator windings, consecutively numbered $m_2 = 1, 2, \ldots, M$, where each stator winding in the second plurality winds around one or more stator poles of the second stator;

a first plurality of M activatable current sources, consecutively numbered $k_1 = 1, 2, \ldots, M$, connected to the respective stator windings consecutively numbered $m_1 = 1, 2, \ldots, M$ in the first plurality of stator windings;

a second plurality of M activatable current sources, consecutively numbered $k_2 = 1, 2, \ldots, M$, connected to the respective stator windings consecutively numbered $m_2 = 1, 2, \ldots, M$ in the second plurality of stator windings, where the current carried in stator winding number $m_2 = m$ (m numbered consecutively $1, 2, \ldots, M$) in the second plurality of stator windings differs in phase from the current carried in stator winding number $m_1 = m$ in the first plurality of stator windings by a phase angle $\phi = 360°/N$, where N is the number of phases of the stepping motor apparatus; and activation means for periodically activating the current sources numbered to sequentially produce magnetic fluxes in each stator winding.

2. The apparatus of claim 1, wherein said rotor step angle is chosen to be 0.45°.

3. The apparatus of claim 1, wherein said rotor step angle is chosen to be 0.9°.

4. Stepping motor apparatus for improved angular position control, the apparatus comprising:

first and second coaxial rotors, each having a first rotor component and a second rotor component, each of the four rotor components having a plurality of K uniformly spaced teeth, where K is a predetermined positive integer, with the first and second rotor component teeth on each rotor being angularly displaced relative to one another by an angle $\Delta\theta = \phi_r/2$, where $\phi_r$ is the nominal rotor pitch angle, with the teeth on the first rotor component of the first rotor and the teeth on the first rotor component of the second rotor having no angular offset relative to one another, and each rotor component including magnet means, polarized in the direction of the rotor axis, for impressing a magnetic field in the rotor axis direction on the rotor teeth;

a first stator and a second stator that are coaxial with the first and second rotors, respectively, each stator having a plurality of stator poles and a plurality of stator teeth that are uniformly spaced within each stator pole and that have a nominal stator pitch angle $\phi_{sta} = \phi_r$, where the first and second stators are angularly offset relative to one another by a step angle $\phi_s$ and laterally surround the first and second rotors, respectively;

a first plurality of M current-carrying stator windings, consecutively numbered $m_1 = 1, 2, \ldots, M$, where each stator winding in the first plurality winds around one or more stator poles of the first stator and where M is a predetermined positive integer;

a second plurality of M current-carrying stator windings, consecutively numbered $m_2 = 1, 2, \ldots, M$, where each stator winding in the second plurality winds around one or more stator poles of the second stator;

a first plurality of M activatable current sources, consecutively numbered $k_1 = 1, 2, \ldots, M$, connected to the respective stator windings numbered $m_1 = k_1$ in the first plurality of stator windings;

a second plurality of M activatable current sources, consecutively numbered $k_2 = 1, 2, \ldots, M$, connected to the respective stator windings numbered $m_2 = k_2$ in the second plurality of stator windings, where the current carried in stator winding number $m_2 = m$ (m consecutively numbered $1, 2, \ldots, M$) in the second plurality of stator windings differs in phase from the current carried in stator winding number $m_1 = m$ in the first plurality of stator windings by a phase angle $\phi = 360°/N$, where N is the number phases of the stepping motor apparatus; and activation means for periodically activating the current sources numbered to sequentially produce magnetic fluxes in each stator winding.

5. The apparatus of claim 4, wherein said rotor step angle is chosen to be 0.45°.

6. The apparatus of claim 4, wherein said rotor step angle is chosen to be 0.9°.

7. Stepping motor apparatus for improved angular position control, the apparatus comprising:

a rotor having first and second coaxial rotor caps, each cap having a plurality of K uniformly spaced teeth, where K is a predetermined positive integer, with the first and second rotor caps being angularly displaced relative to one another by angle $\Delta\theta_o = \phi_s$, where $\phi_s$ is the step angle, and with the rotor having a rotor axis and including a magnet means, polarized in the direction of the rotor axis, for impressing a magnetic field in the rotor axis direction on the rotor teeth;

a first stator and a second stator that are coaxial with the first rotor cap and second rotor cap, respectively, each stator having a plurality of stator poles and having a plurality of stator teeth that are uniformly spaced within each stator pole and that have a stator pitch angle $\phi_{sta} = \phi_p$, where the first and second stators are angularly aligned with each other and laterally surround the first and second rotor caps, respectively;

a first plurality of M current-carrying stator windings, consecutively numbered $m_1 = 1, \ldots, M$, where each stator winding in the first plurality winds around one or more poles of the first stator, and where M is a predetermined positive integer;

a second plurality of current-carrying windings, consecutively numbered $m_2 = 1, \ldots, M$, where each stator winding in the second plurality winds around one or more poles of the second stator;

a first plurality of activatable current sources, consecutively numbered $k_1 = 1, \ldots, M$, connected to the respective stator windings consecutively numbered $m_1 = 1, \ldots, M$ in the first plurality of windings;

a second plurality of activatable current sources, consecutively numbered $k_2 = 1, \ldots, M$, connected to the respective stator windings numbered $m_2 = 1, \ldots, M$ in the second plurality of windings, where the current carried in stator winding number $m_2 = m$ (m consecutively numbered $1, \ldots, M$) in the second plurality of stator windings differ in phase from the current carried in stator winding number $m_1 = m$ in the first plurality of stator windings by a phase angle $\phi = 360°/N$, where N is the number of phases of the stepping motor apparatus; and activation means for periodically activating the first and second current sources to sequentially produce magnetic fluxes in each stator winding.

8. Stepping motor apparatus for improved angular position control, the apparatus comprising:

a rotor having first and second rotor caps, each rotor cap having a plurality of K uniformly spaced teeth, where K is a predetermined positive integer, with the first and second rotors being angularly aligned with each other, and with the rotor having a rotor axis and including a magnet means, polarized in the direction of the rotor axis, for impressing a magnetic field in the rotor axis direction on the rotor teeth;

a first stator and a second stator that are coaxial with the first rotor cap and second rotor cap, respectively, each stator having a plurality of stator poles and having a plurality of stator teeth that are uniformly spaced within each stator pole and that have a stator pitch angle $\phi_{sta} = \phi_p$, where the first and second stators are angularly offset relative to one another by an angle $\alpha\theta_o = \phi_s$, where $\phi_s$ is the step angle, and laterally surround the first and second rotor caps, respectively;

a first plurality of M current-carrying stator windings, consecutively numbered $m_1 = 1, \ldots, M$, where each stator winding in the first plurality winds around one or more poles of the first stator, and where M is a predetermined positive integer;

a second plurality of current-carrying windings, consecutively numbered $m_2 = 1, \ldots, M$, where each stator winding in the second plurality winds around one or more poles of the second stator;

a first plurality of activatable current sources, consecutively numbered $k_1 = 1, \ldots, M$, connected to the respective stator windings numbered $m_1 = 1, \ldots, M$ in the first plurality of windings;

a second plurality of activatable current sources, consecutively numbered $k_2 = 1, \ldots, M$, connected to the respective stator windings numbered $m_2 = 1, \ldots, M$ in the second plurality of windings, where the current carried in stator winding number $m_2 = m$ (m numbered consecutively $1, \ldots, M$) in the second plurality of stator windings differs in phase from the current carried in stator winding number $m_1 = m$ in the first plurality of stator windings by a phase angle $\phi = 360°/N$, where N is the number of phases of the stepping motor apparatus; and activation means for periodically activating the first and second current sources to sequentially produce magnetic fluxes in each stator winding.

9. Stepping motor apparatus for improved angular position control, the apparatus comprising:

a rotor having a plurality of K uniformly spaced teeth, consecutively numbered $k = 1, 2, \ldots, K$, where K is an integer $> 2$, having a pitch angle $\phi_r = 360°/K$, and having a rotor axis and including magnet means, polarized in the direction of the rotor axis, for impressing a magnetic field in the rotor axis direction on the rotor teeth;

a stator that is coaxial with the rotor, the stator having a plurality of M stator poles and having a plurality of stator teeth, consecutively numbered $j = 1, 2, \ldots, J$, where M and J are integers $> 2$, that are uniformly spaced within each stator pole and that have a stator pitch angle $\phi_{sta} = 2 \phi_r$ so that three consecutive stator teeth numbered $j, j+1$ and $j+2$ in a stator pole group may be aligned with three rotor teeth numbered $k, k+2$ and $k+4$, respectively;

a plurality of M current-carrying stator windings, consecutively numbered $m_1 = 1, \ldots, M$, where each stator winding winds around one or more poles of the stator;

a plurality of activatable current sources, consecutively numbered $m_2 = 1, \ldots, M$, connected to the respective stator windings numbered $m_1 = m_2$; and activation means for periodically activating the current sources to sequentially produce magnetic fluxes in each stator winding.

* * * * *